United States Patent [15] 3,680,844
Menges et al. [45] Aug. 1, 1972

[54] SINGLE WORM EXTRUDER

[72] Inventors: Hans G. L. Menges, Laurensberg by Aachen; Josef P. Lehnen, Verlautenheide by Aachen; Englebert G. Harms, Laurensberg by Aachen, all of Germany

[73] Assignee: Uniroyal Englebert Deutschland AG, Aachen, Germany

[22] Filed: July 16, 1970

[21] Appl. No.: 55,542

[30] Foreign Application Priority Data

July 16, 1969 Germany............P 19 36 418.2

[52] U.S. Cl. ..................259/191, 425/205, 425/261
[51] Int. Cl. ..............................................B29f 3/01
[58] Field of Search.18/12 SB, 12 SM, 12 SS, 12 SN, 18/12 SP, 12 SR, 12 SE, 12 SV, 14 R

[56] References Cited

UNITED STATES PATENTS 3,252,182  5/1966  Colombo................18/12 SB X
3,026,273  3/1962  Engles....................18/12 SM X
2,813,302  11/1967 Beck........................18/12 SB X

*Primary Examiner*—J. Spencer Overholser
*Assistant Examiner*—David S. Safran
*Attorney*—Robert S. Salzman

[57] ABSTRACT

A single worm extruder for the mixing and processing of rubber is disclosed. The worm consists of two sections, an intake section and a mixing section. The mixing section has lands countercurrent to those of the intake section for partially back-feeding the rubber on to the intake section to provide a turbulent current of material. The countercurrent lands are interrupted by gaps which collectively have the same total area as the cross-sectional area of the intake section. The gaps in the mixing section are of constant width and have a diameter of not less than 10 mm and not more than 12 mm. The mixing section has a larger core and outer diameter than the intake section.

8 Claims, 5 Drawing Figures

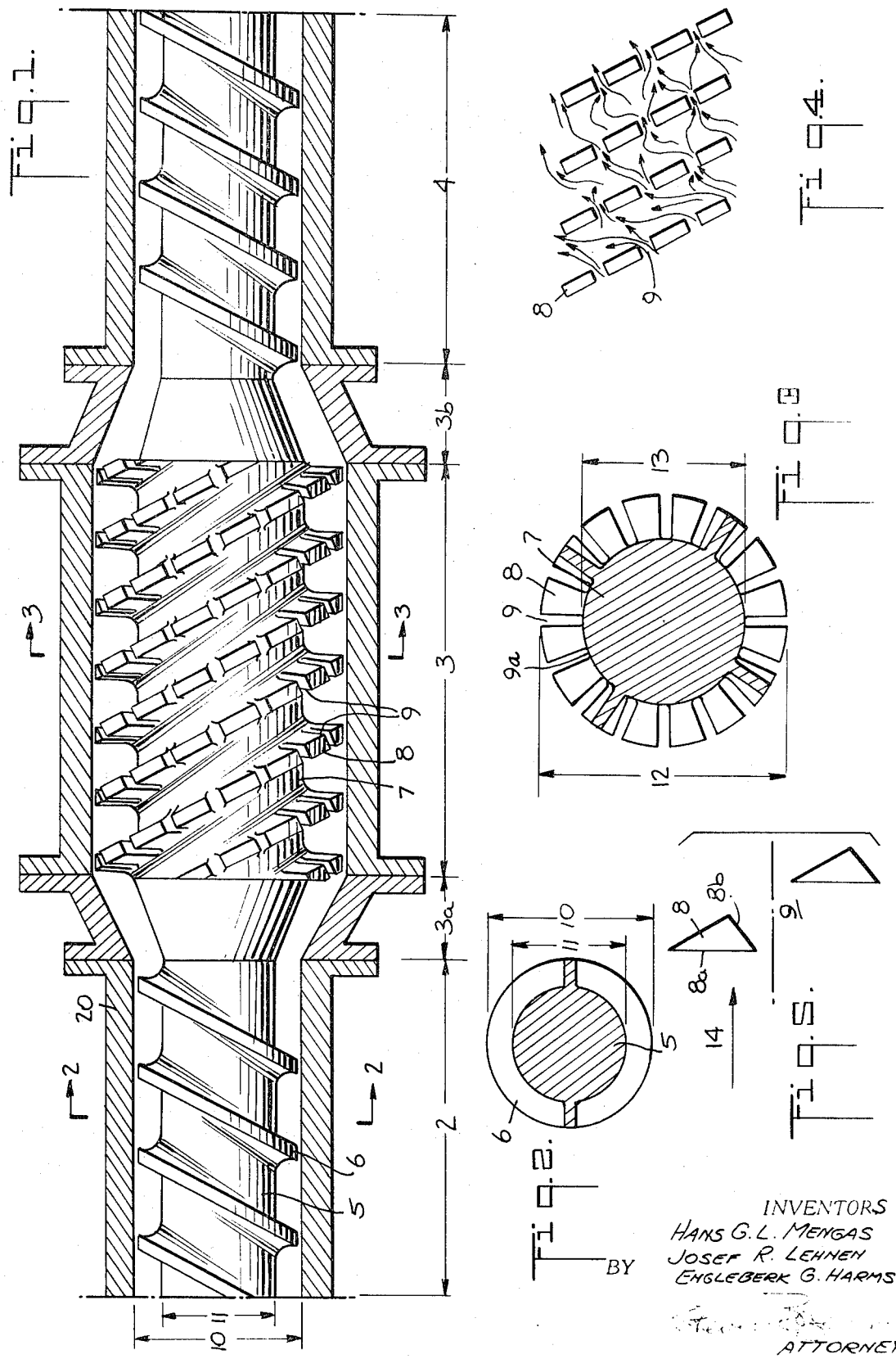

SINGLE WORM EXTRUDER

BACKGROUND OF THE INVENTION

The invention relates to apparatus for processing highly viscous materials, particularly the processing of rubber mixtures with varied proportions of natural rubber and fillers in a single worm extruder.

As used herein the terms "plastic" and "plastic materials" are intended to mean materials which are yieldable or moldable in nature.

In order to achieve an extruded plastic of good quality it is necessary to extensively mix the plastic material to produce a homogenous product while maintaining temperature constant over time at any particular point along the extruder. In a single worm extruder the mixing and the homogenizing of the plastic material is carried out by a single rotating screw mounted in a cylindrical barrel. The material is homogenized, masticated, and intermixed by the interaction of the rotating worm or screw and the cylinder walls. After the material is mechanically and thermally mixed into a homogenous substance, it is then ejected through a die to form its permanent shape. The passage through the die should be at as uniform a speed as possible.

Screw extruders are known for the processing of rubber, plastic and the like in which the screw is divided into segments of different configuration such that the homogenity and the uniform plasticity is improved by the separation of molten and solid materials. This is done by causing the extrudant to flow between the land of the screw and the inside wall of the screw cylinder. The melt is separated from the solid phase of the plastic to be processed during the conveying of the latter in the screw by collecting it in a receptacle which the components of the plastic still in the solid phase cannot reach.

In this process, the heat resulting from the mastication of the material in the worm is utilized to liquify the extrudant. However, when processing rubber mixtures, it is undesirable to heat the rubber beyond 120° C. since the rubber mixture will be damaged. On the other hand, due to the high apparent viscosity of rubber mixtures, rubber heats up relatively quickly while being mixed and homogenized, especially when high output is needed. This is particularly true with mixtures containing high percentages of natural rubber. Additionally the poor heat conductivity of rubber mixtures results in irregular heating during the mixing and homogenizing process. The resulting non-homogenous high temperature affects the quality of the extrusion.

SUMMARY OF THE INVENTION

It is the object of the invention to make it possible to carry out the processing of highly viscous materials, particularly rubber mixtures, by means of a single worm extruder.

The present invention is characterized in that the material to be extruded is fed by the screw into a mixing zone having lands positioned to form a screw in the opposite direction so as to feed back upon itself the material to be extruded. Gaps in the lands forming the worm permit forward flow of the material. The edges of the gaps are approximately parallel and have a minimum gap width of 10 mm and maximum of 12 mm.

The breakthrough area in the mixing zone resulting from the interruptions in the lands should approximately correspond to the annual cross-sectional area of the worm of the intake zone. Disposed on either end of the mixing zone are relatively short transition zones. These are to prevent dead spaces in which material is not mixed. The width of the land interruptions should remain as constant as possible all the way to the core of the worm in the mixing zone. This in part necessitates an enlargement of the screw diameter in the mixing zone for the achievement of the correct ratio between the total area of the interruptions in the lands to the annular cross-sectional area of the intake zone. This enlargement also helps to keep the temperature of the mixing zone below the 120° C. The core diameter of the worm in the mixing zone equals or is slightly larger than that of the intake zone for structural stability due to the increased load in this zone.

In order to control the flow of material in the mixing zone and to compensate for heat development, the essentially rectangular teeth formed by the gaps in the land may be bevelled or chamfered at right angles to the centerline of the worm on the side opposing the conveying direction. The maximum bevel would be such as to approximate a diagonal line across an unmodified tooth. Also, on the side facing the conveying direction, the teeth gaps may have surfaces chamfered at an angle to the flow of material. In this manner, the mixing and homogenizing may be controlled with relation to the forward conveying of the rubber to produce the correct ratio of heating and mixing.

In operation the rubber in the mixing zone is subject to transport back toward the intake zone. While back up pressure opposed to the general conveying direction would normally heat the material beyond an acceptable temperature, the enlarged size of the mixing zone in comparison to the intake zone dissipates the excess pressure. The mixing takes place mainly due to flow division and reversal. Thus while mixing is normally associated with high temperature and large cross-sectional area is associated with inadequate mixing, the present invention combines both to produce intensive mixing with permissible heat development. A critical range of gap widths for rubber mixtures has been experimentally derived. When the gaps are less than 10 millimeters, an undue increase of mixing temperature results and when the gaps are wider than 12 millimeters there is poor mixing homogenity.

This type of processing within the screw extruder mixes the material while heating it uniformly. The mixing zone of the present invention in a single worm extruder gives a high degree of homogenization with uniform plasticity and the correct amount of heating.

BRIEF DESCRIPTION OF THE DRAWINGS

The invention is illustrated in the following drawings:

FIG. 1 is a simplified side view of an extruder according to the present invention;

FIGS. 2 and 3 are cross-sectional views of the screw according to the present invention along lines 2—2 and 3—3 of FIG. 1, respectively;

FIG. 4 is a schematic representation of the flow of rubber through the gaps in the lands of the mixing zone of the embodiment of FIG. 1; and FIG. 5 is a side view of a portion of the lands in the mixing zone of another embodiment of the present invention.

DESCRIPTION OF THE PREFERRED EMBODIMENT

As seen in FIG. 1 through 3 the extruder 1 has an intake zone 2 and a mixing zone 3. A further working or transporting zone 4 or an extrusion die (not shown) may be positioned directly adjacent to zone 3. The intake zone 2 by means of single multi-threaded screw segment 5 mounted in housing 20 moves the material to be extruded from an intake opening or the like into the mixing zone 3. The lands 6 of screw segment 5 are arranged at an oblique angle to the central axis of the screw 5.

This zone is followed by the mixing zone 3 in which there is a counter-current single (not shown) or multi-threaded screw 7 of larger outer and core diameter than screw segment 5. The screw segment 7 has lands 8 oriented contrary to lands 6 of zone 2 and interrupted by gaps 9. Gaps 9 are shown regular spaced but may be irregularly spaced if desired.

As can be seen in FIG. 4, the contrary orientation and interruptions in the lands cause the flow of rubber to be divided and deflected. The material being extruded forms congested areas in front of the ungaped portions of the lands 8. Due to the pressure of additional material being carried into zone 3 and the rotational movement of the screw segment 7 the material is forced to flow thru the slots to the right and left of each ungaped portion. Thereafter the material is again deflected and forced through successive gaps in the latter portions of screw segment 7. These reversals and deflections eliminate local overheating and scorching while intensively mixing and plasticizing the material so that by the end of mixing zone 3 the material is mechanically and thermally homogenous.

It has been experimentally found that for rubber mixtures the edges of the gaps 9 should be parallel and have a width of between 10 and 12 millimeters. When the gap is less than 10 mm high mixing temperatures result causing damage to the rubber stock, at more than 12 mm, the robber stock does not become homogenized. It has also been found that mixing is intensified through increasing the number of deflections by maximizing the number of gaps 9. The structural requirements of the screw however, may necessitate slight variation from these limitations, e.g., the gap edges may slightly vary from parallel, without destroying the unique results of the present invention.

The gaps 9 should extend all the way to the core portion of screw segment 7. For stability and improved strain patterns in the lands 8, the bottom 9a of the gaps 9 may be rounded as illustrated.

The annular cross-sectional area of the intake zone 2 measured between the outside diameter 10 and the inside diameter 11 of the worm segment 5, and the breakthrough area i.e., the total area of the gaps 9 in the lands 8 as shown in FIG. 3 should be approximately equal. This ratio may vary between 0.5:1 and 2:1, due to the nature of the material processed and the strength and stability requirements of the land roots. Due to the additional pressure placed on the countercurrent land in mixing zone 3, the diameter 13 of the worm core in worm segment 7 should be slightly larger than the diameter 11 of the worm core in segment 5.

In order to harmonize these criterian, i.e., total gap area, correct gap width and enlarged core diameter, with the strength requirements of land 8, the outer diameter 12 of the mixing zone 3 is made larger than the outer diameter 10 of the intake zone 2. More importantly when this results in an enlarged working volume for screw segment 7 over screw segment 5, it serves to help keep the temperature of the mixing zone in an acceptable range by dissipating high pressure buildup. Through the enlargement of this section, complete mixing is allowed to take place by flow division and reversal without undue heat buildup.

In order to further control temperature and mixing, the essential rectangular teeth formed by the gaps in the lands 8 may be shaped to control the flow of material. As can be seen in FIG. 5, if the general flow of material is in the direction indicated by arrow 14, the backward transport in the opposite direction can be regulated by bevelling or chamfering the edge 8a of land 8 which faces into the flow of material at right angles to the centerline of the worm. The maximum chamfering would be such as to approximate a diagonal line across an unmodified tooth to form a wedge as seen in FIG. 5. Flow in the direction of arrow 14 may be controlled by chamfering the outer edges 8b of the teeth gaps 9 facing out of the material flow at an angle to the direction of flow. All modification of the tooth shape should extend to the core of worm segment 7.

Zones 3a and 3b form a transtition between intake zone 2 and further working zone 4 or the die. The core diameter in this zone is varied in order to smoothly connect the various zones. The housing 20 may have separate housing joined by flanges to facilitate cleaning. The entire worm assembly may be formed of a single piece or be composed of several parts.

While there has been described what is at present considered to be the preferred embodiment of this invention, various changes and modifications may be made therein without departing from the spirit of the invention and it is intended to cover all such changes which may come within the scope of the invention.

Having thus described my invention, what I claim and desire to protect by Letters Patent is:

1. A worm extruder for rubber mixtures and the like, comprising:
    an intake zone having a first screw means with a helical land forming a flight in a first direction, and
    a mixing zone having a second screw means with at least one land forming a flight in the opposite direction from said screw means, the outer diameter of said second screw means is larger than the outer diameter of the first screw means, said lands having gaps of approximately constant width for most of the length of the gaps, whereby the material being extruded is divided and partially fed back on itself to thermally and mechanically homogenize the material being extruded.

2. A worm extruder for rubber mixtures and the like, comprising:
    an intake zone having a first screw means with a helical land forming a flight in a first direction, and
    a mixing zone having a second screw means with at least one land forming a flight in the opposite direction from said first screw means, said land in said second screw, in one full turn of the screw having gaps whose total cross-sectional area is in a range of one-half to twice the cross-sectional area between an outside circumference and a core of said first screw means.

3. The extruder of claim 2 wherein the total cross-sectional area of the gaps in the land of the second screw means approximates the cross-sectional area between the outside circumference and the core of the first screw means.

4. The extruder of claim 1 wherein the gaps extend to the core of said second screw means.

5. The extruder of claim 1 wherein one side of at least one of the teeth formed by the gaps in the land of the second screw means is bevelled for at least part of its surface at right angles to the second screw means centerline.

6. The extruder of claim 1 wherein at least one side of at least one gap in the land in the second screw means is bevelled at an angle to the centerline of the second screw means to control the forward flow.

7. The extruder of claim 1 wherein the core of the second screw means is larger than the core of the first screw means.

8. The extruder of claim 1 wherein the bottom of the gaps in the land of the second screw means is rounded.

* * * * *